April 30, 1929.   G. C. LAMBE   1,711,233
CENTER BEARING PLATE FOR ARTICULATED CAR UNITS
Filed June 23, 1928

INVENTOR

Patented Apr. 30, 1929.

1,711,233

UNITED STATES PATENT OFFICE.

GEORGE C. LAMBE, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

CENTER-BEARING PLATE FOR ARTICULATED CAR UNITS.

Application filed June 23, 1928. Serial No. 287,744.

An object of my invention is to provide a center bearing for an articulated car unit, the lower portion of which is adapted to collect any dirt or foreign matter which may enter the bearing due to operation or wear.

Another object of my invention is to provide means on said center bearing for facilitating the removal of the collected dirt without taking apart the bearing or dismantling the articulated joint, and also to facilitate the lubrication of the bearing by forcing lubricant into the assembled center bearing.

Figure 1:
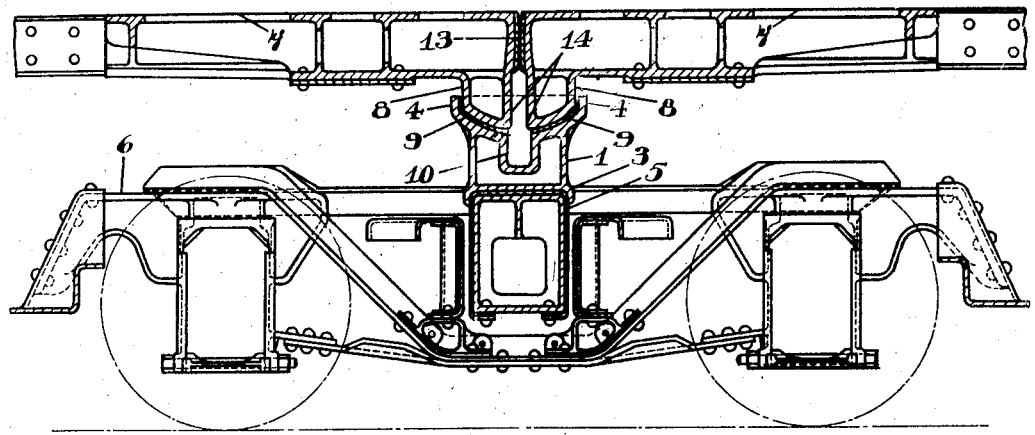
Figure 2:
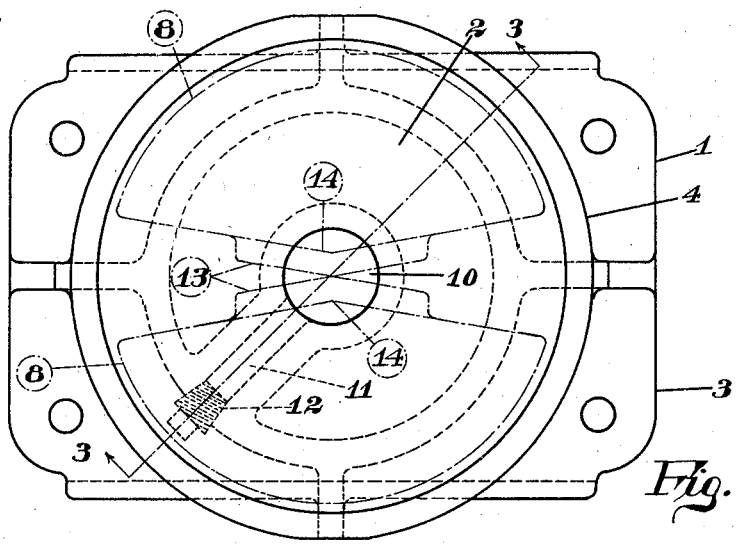
Figure 3:
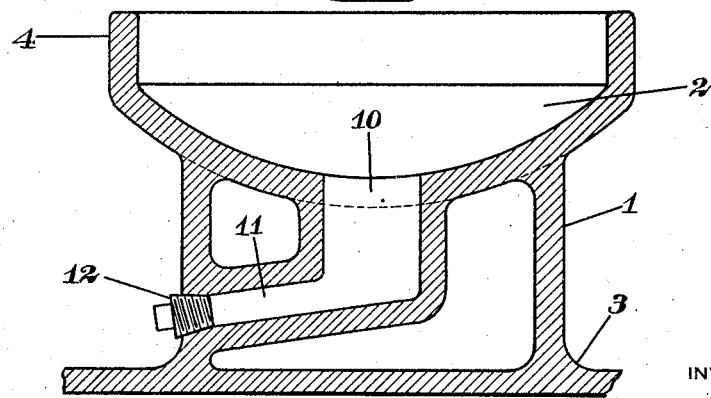

Referring to the drawings, Fig. 1 is a section in elevation through the center bearing plate showing its relation to the truck and car bodies; Fig. 2 is an enlarged plan view of the center bearing plate with the body bearing portions shown in dot and dash lines; Fig. 3 is a section through the center bearing plate along the lines 3—3 of Fig. 2.

Referring now in detail to the drawings, reference character 1 indicates the articulated car center bearing plate having a concave central portion 2, a base portion 3 and a substantially vertical peripheral portion 4 encircling the upper edge of the portion 2. The base portion 3 of the center bearing plate is supported on the bolster 5 of the truck 6 which is common to both car bodies. Depending downwardly from the car bodies 7 are body bearing portions 8 which are adapted to be supported in the concave portion 2 of the center bearing plate. Interposed between the body bearing portions 8 and the concave portion 2 of the center bearing 1 are liners 9 which prevent excessive wear on the bearing but form no part of the invention.

During the operation of the articulated car the center bearing is exposed to dirt and other foreign matter which tends to accumulate in the bearing, preventing efficient operation and causing undue wear of the contacting parts. To prevent this accumulating of dirt and other foreign matter between the portions comprising the bearing, a well 10 is provided in the base of the portion 2 of the bearing center plate with a passageway 11 connecting the base of the well 10 with the exterior of the base of the bearing plate. The outer end of the passageway 11 is tapped to receive a pipe plug 12 which is normally in position closing the passageway.

By referring to Figs. 1 and 2 it will be noted that the ends of the bodies 7 have contacting projecting surfaces 13 at the top and downward depending portions 8 which are shaped like portions of a sphere, the lower ends 14 of which have their inner edges near the periphery of the top of the well 10. Any dirt entering the bearing during operation of the car will tend to move by gravity down into the well and that which accumulates on the sides of the portion 2 will be scraped off by the movements of the portions 8 and move by gravity into the well 10. The plug 12 can be removed periodically and the well 10 cleaned out through the passageway 11 without disturbing the bearing assembly. It will be obvious to those skilled in the art that after the dirt has been removed through the passageway 11, a grease gun may be screwed into the passageway and lubricant forced up into the bearing and between the body portions 8.

Having thus described the invention what I claim as new and desire to secure by Letters Patent is:

1. The combination in an articulated car truck center bearing plate of a concave body bearing receiving portion and a well at the base of said portion, said well being adapted to collect any dirt which may enter the bearing.

2. The combination in a bearing plate for an articulated car center bearing of a concave body bearing receiving portion and means in the base thereof to receive any dirt which may enter the concave portion and move by gravity to the base thereof, and to permit the forcing of grease by pressure into the assembled center bearing.

3. The combination in a bearing plate for an articulated car center bearing of a concave body supporting portion, a dirt collector in the base of said concave portion and a passageway connecting the base of the dirt collector with the exterior of the center plate.

In testimony whereof I affix my signature.

G. C. LAMBE.